(12) United States Patent
Yan et al.

(10) Patent No.: US 12,000,125 B2
(45) Date of Patent: Jun. 4, 2024

(54) FAUCET

(71) Applicant: Xiamen Forbetter Sanitary Ware Co., Ltd., Fujian (CN)

(72) Inventors: Xiliang Yan, Xiamen (CN); Yihui Chen, Xiamen (CN); Qiang Chen, Xiamen (CN)

( * ) Notice: Subject to any disclaimer, the term of this patent is extended or adjusted under 35 U.S.C. 154(b) by 955 days.

(21) Appl. No.: 17/000,376

(22) Filed: Aug. 24, 2020

(65) Prior Publication Data

US 2021/0123220 A1    Apr. 29, 2021

(30) Foreign Application Priority Data

Oct. 29, 2019    (CN) .......................... 201911040501.1

(51) Int. Cl.
| | |
|---|---|
| *E03C 1/05* | (2006.01) |
| *E03B 7/07* | (2006.01) |
| *E03C 1/04* | (2006.01) |
| *F16K 11/00* | (2006.01) |
| *F16L 37/084* | (2006.01) |
| *G01F 1/58* | (2006.01) |
| *G05D 7/06* | (2006.01) |

(52) U.S. Cl.
CPC .............. *E03C 1/055* (2013.01); *E03B 7/072* (2013.01); *E03B 7/075* (2013.01); *E03B 7/078* (2013.01); *E03C 1/04* (2013.01); *E03C 1/057* (2013.01); *F16K 19/006* (2013.01); *F16L 37/0841* (2013.01); *G01F 1/58* (2013.01); *G05D 7/0658* (2013.01)

(58) Field of Classification Search
CPC ...... F16L 37/0841; E03C 1/057; E03C 1/055; F16K 11/22; F16K 19/006; F16K 11/24; E03B 7/078; E03B 7/072; E03B 7/075
See application file for complete search history.

(56) References Cited

U.S. PATENT DOCUMENTS

| | | | | |
|---|---|---|---|---|
| 2007/0094787 | A1* | 5/2007 | Hwang | ................... E03C 1/057 4/623 |
| 2007/0221277 | A1* | 9/2007 | Hubmann | ............... F16L 37/32 137/614.02 |
| 2008/0078019 | A1* | 4/2008 | Allen, Jr. | ................ E03C 1/057 137/603 |
| 2012/0017367 | A1* | 1/2012 | Reeder | .................... E03C 1/057 4/597 |
| 2014/0062080 | A1* | 3/2014 | Battisti | ................. F16L 37/086 285/86 |

FOREIGN PATENT DOCUMENTS

CN                201397161 Y  *  2/2010

* cited by examiner

*Primary Examiner* — Atif H Chaudry

(57) ABSTRACT

A faucet includes a faucet spout, a communication valve, a first valve cartridge, a second valve cartridge, a solenoid valve, and an induction control circuit. A first input end, a second input end and a third input end of the communication valve are connected to the first valve cartridge, the second valve cartridge and the solenoid valve, respectively. An output end of the communication valve is connected to the faucet spout. The communication valve is provided with a water flow sensor electrically connected to the induction control circuit. The faucet provides a manual mode and an induction mode to control the flow of water and is convenient to use and can prolong its service life.

13 Claims, 8 Drawing Sheets

FAUCET

BACKGROUND OF THE INVENTION

1. Field of the Invention

The present invention relates to a faucet, and more particularly to a two-handle faucet.

2. Description of the Prior Art

In the prior art, most two-handle faucets use mechanical handle switches to control the opening and closing of the flow of water. One handle switch controls the opening and closing of the flow of hot water, the other handle switch controls the opening and closing of the flow of cold water. Then, the water flows out through the faucet spout to obtain hot water, cold water or mixed water. However, the drawback of the mechanical two-handle faucet is that it is inconvenient to use and easy to cause bacterial infection.

In some public places, the flow of water of a faucet is controlled in a touch manner or in an induction mode. However, these touch and inductive faucets have only one opening function. If the touch switch or the inductive switch is damaged, the faucet cannot be used and has a short service life.

SUMMARY OF THE INVENTION

The primary object of the present invention is to provide a faucet, which provides a manual mode and an induction mode to control the flow of water and is convenient to use and can prolong its service life.

In order to achieve the above object, the present invention adopts the following solutions.

A faucet comprises a faucet spout, a communication valve, a first valve cartridge, a second valve cartridge, a solenoid valve, and an induction control circuit. The faucet spout has an outlet channel therein. The communication valve has an output end, a first input end, a second input end, and a third input end. The output end is connected to the faucet spout. A first channel and a second channel are provided in the communication valve. The first channel communicates with the first input end, the second input end and the output end. The first channel is provided with a water flow sensor. The second channel communicates with the third input end and the output end. The first valve cartridge has a first inlet end and a first outlet end. The first outlet end is connected to the first input end of the communication valve. The first inlet end is configured to connect with a first water supply. The second valve cartridge has a second inlet end and a second outlet end. The second outlet end is connected to the second input end of the communication valve. The second inlet end is configured to connect with a second water supply. The solenoid valve has a first water inlet, a second water inlet and an output waterway. The first water inlet is configured to connect with the first water supply. The second water inlet is configured to connect with the second water supply. The output waterway is connected to the third input end of the communication valve. The induction control circuit is disposed on the faucet spout and includes an induction window. When the induction control circuit receives a signal generated by the water flow sensor when water flows through the first channel, the induction control circuit controls the solenoid valve to be closed according to the signal and an induction fails. When the induction control circuit does not receive the signal of the water flow sensor and triggers the induction window for induction, the induction control circuit controls the solenoid valve to be opened.

According to the faucet of the present invention, when the first valve cartridge and/or the second valve cartridge are opened, the water flows into the first channel of the communication valve, and the water flow sensor sends a signal to the induction control circuit. The induction control circuit controls the solenoid valve to be closed according to the signal and the induction fails. At this time, the flow of water is controlled in a manual manner. When the first valve cartridge and/or the second valve cartridge are closed, the water does not pass through the water flow sensor. At this time, the induction window is triggered for induction, and the induction control circuit controls the solenoid valve to be opened. At this time, the flow of water is controlled in an induction manner. When an abnormal induction or power failure occurs, the flow of water can be controlled in a manual manner through the first valve cartridge and/or the second valve cartridge. Therefore, the present invention realizes a manual mode and an induction mode to control the flow of water. It is convenient to use the faucet, and the service life of the faucet can be prolonged.

In addition, the faucet according to the above-mentioned embodiment of the present invention may have the following additional technical features:

Preferably, the faucet further comprises a control box. The control box is provided with a first inlet passage for connecting with the first water supply and a second inlet passage for connecting with the second water supply. The first inlet passage is connected to the first inlet end of the first valve cartridge. The second inlet passage is connected to the second inlet end of the second valve cartridge. The first water inlet of the solenoid valve communicates with the first inlet passage through a first connecting passage. The second water inlet of the solenoid valve communicates with the second inlet passage through a second connecting passage.

Preferably, the first connecting passage is provided with a flow control valve.

Preferably, the flow control valve includes a valve seat, a valve stein, and a valve plate. One end of the valve stein is connected to the valve seat, and another end of the valve stein is connected to the valve plate. The valve plate is inserted into the first connecting passage. The valve seat is rotatable to change a water-passing area of the first connecting passage.

Preferably, the valve seat has an adjustment surface, and the adjustment surface is formed with an adjustment groove.

Preferably, each of the first connecting passage and the second connecting passage is provided with a one-way valve that allows water to flow to the solenoid valve.

Preferably, the one-way valve includes a valve body, a valve plug, and a compression spring. The valve body has a water-passing cavity therein. The valve plug is disposed in the water-passing cavity and is movable axially along the water-passing cavity. The compression spring is sleeved on the valve plug. One end of the compression spring abuts against the valve body, and another end of the compression spring abuts against the valve plug for blocking an inlet of the water-passing cavity. When water flows through the solenoid valve, water pressure drives the valve plug to move and open the inlet of the water-passing cavity.

Preferably, the solenoid valve is arranged in the control box.

Preferably, the first water supply is a hot water supply.

Preferably, the second water supply is a cold water supply.

Preferably, the water flow sensor includes a magnetic impeller that is rotatably arranged in the first channel and a Hall element that is arranged outside the first channel. The Hall element is electrically connected to the induction control circuit. The Hall element is configured to sense whether the magnetic impeller rotates and output the signal to the induction control circuit.

Preferably, an outer side of the communication valve, corresponding in position to the first channel, is formed with a receiving groove, the Hall element is fitted in the receiving groove, and the receiving groove is provided with glue for sealing the Hall element.

Preferably, an outlet of the first channel of the communication valve is provided with a check valve that allows water to flow in one direction only to the output end of the communication valve.

Preferably, the first input end, the second input end and the output end of the communication valve respectively communicate with the first outlet end of the first valve cartridge, the second outlet end of the second valve cartridge and the outlet channel of the faucet spout through a quick-release structure. The quick-release structure includes a hollow connector and a receiving seat. One end of the connector is formed with a plug-in tube mating with the receiving seat. A middle portion of the receiving seat is formed with a receiving hole mating with the plug-in tube of the connector. The receiving seat is provided with two opposite elastic buckles. The two elastic buckles can be moved towards each other or moved away from each other to release or hold the plug-in tube of the connector. The receiving seat and the connector of the quick-release structure that connects the first input end of the communication valve and the first outlet end of the first valve cartridge are connected to the first input end of the communication valve and the first outlet end of the first valve cartridge, respectively. The receiving seat and the connector of the quick-release structure that connects the second input end of the communication valve and the second outlet end of the second valve cartridge are connected to the second input end of the communication valve and the second outlet end of the second valve cartridge, respectively. The receiving seat and the connector of the quick-release structure that connects the output end of the communication valve and the outlet channel of the faucet spout are connected to the output end of the communication valve and the outlet channel of the faucet spout, respectively.

Preferably, each elastic buckle has a holding arm with a C-shaped opening. An inner surface of the C-shaped opening of the holding arm is composed of a small arc surface with a smaller radius and a large arc surface with a larger radius. An outer wall of the plug-in tube of the connector is formed with an engaging groove. When the small arc surfaces of the two elastic buckles face each other to form a small hole, the holding arms of the two elastic buckles hold the plug-in tube of the connector tightly. When the large arc surfaces of the two elastic buckles face each other to form a large hole, the plug-in tube of the connector can enter and exit the receiving seat.

Preferably, an inner side of each elastic buckle is provided with an elastic piece, and two ends of the elastic piece respectively act on the elastic buckle and the receiving seat to give the elastic buckle an outward force.

Preferably, two sides of the receiving seat are formed with side grooves for accommodating the respective elastic buckles. Each elastic buckle further has a blocking wall corresponding in shape to an opening of a corresponding one of the side grooves. The elastic piece is disposed on an inner side of the blocking wall.

DETAILED DESCRIPTION OF THE PREFERRED EMBODIMENTS

Figure 1:
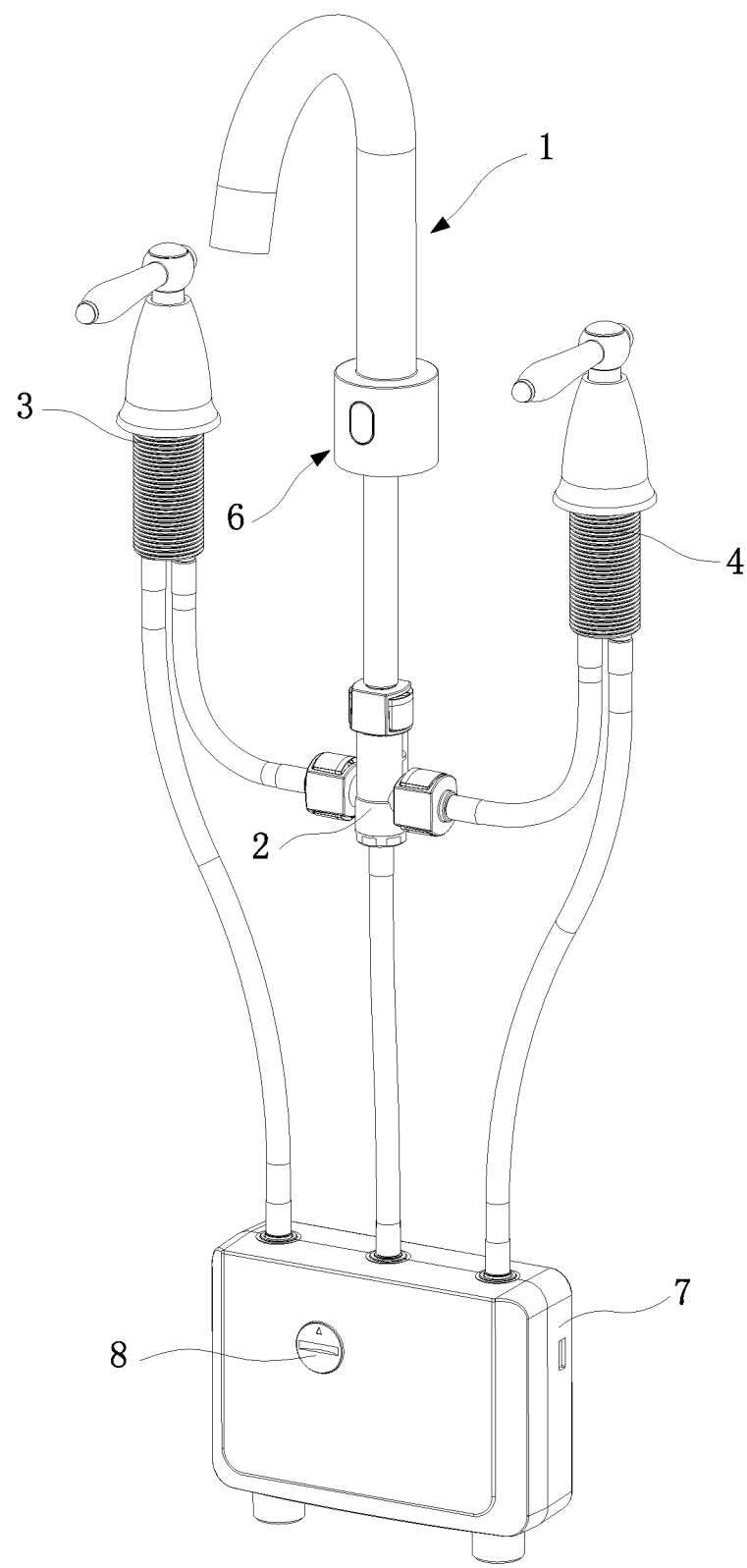
FIG. 1 is a perspective view of the faucet of the present invention.

Embodiments of the present invention will now be described, by way of example only, with reference to the accompanying drawings, wherein the same or similar reference numerals indicate the same or similar elements or elements with the same or similar functions.

Referring to FIG. 1 through FIG. 9, the present invention discloses a faucet, comprising a faucet spout 1, a communication valve 2, a first valve cartridge 3, a second valve cartridge 4, a solenoid valve 5, and an induction control circuit 6. The faucet spout 1 has an outlet channel 11 therein. The communication valve 2 is provided with an output end 21, a first input end 22, a second input end 23 and a third input end 24. The output end 21 is connected to the faucet spout 1. A first channel 25 and a second channel 26 are provided in the communication valve 2. The first channel 25 communicates with the first input end 22, the second input end 23 and the output end 21. The first channel 25 is provided with a water flow sensor 251. The water flow sensor 251 is configured to monitor whether there is water flowing through the first channel 25. The second channel 26 communicates with the third input end 24 and the output end 21. The first valve cartridge 3 is provided with a first inlet end 31 and a first outlet end 32. The first outlet end 32 is connected to the first input end 22 of the communication valve 2. The first inlet end 31 is configured to connect with a first water supply. The second valve cartridge 4 is provided with a second inlet end 41 and a second outlet end 42. The second outlet end 42 is connected to the second input end 23 of the communication valve 2. The second inlet end 41 is configured to connect with a second water supply. The solenoid valve 5 is provided with a first water inlet 51, a second water inlet 52, and an output waterway 53. The first water inlet 51 is configured to connect with the first water supply. The second water inlet 52 is configured to connect with the second water supply. The output waterway 53 is connected to the third input end 24 of the communication valve 2. The induction control circuit 6 is disposed on the faucet spout 1, and includes an induction window 61. When the induction control circuit 6 receives a signal generated by the water flow sensor 251 when water flows through the first channel 25, the induction control circuit 6 controls the solenoid valve 5 to be closed according to the signal and the induction fails. When the induction control circuit 6 does not receive the signal generated by the water flow sensor and triggers the induction window 61 for induction, the induction control circuit 6 controls the solenoid valve 5 to be opened.

In the present invention, when the first valve cartridge 3 and/or the second valve cartridge 4 are opened, the water flows into the first channel 25 of the communication valve 2, and the water flow sensor 251 sends a signal to the induction control circuit 6. The induction control circuit 6 controls the solenoid valve 5 to be closed according to the signal and the induction fails. At this time, the flow of water is controlled in a manual manner. When the first valve cartridge 3 and/or the second valve cartridge 4 are closed, the water does not pass through the water flow sensor 251. At this time, the induction window 61 is triggered for induction, and the induction control circuit 6 controls the solenoid valve 5 to be opened. At this time, the flow of water is controlled in an induction manner. When the flow of water is controlled in an induction manner, that is, after the induction control circuit 6 controls the solenoid valve 5 to be opened, the induction window 61 is triggered for induction again, and the induction control circuit 6 controls the solenoid valve 5 to be closed, so as to shut off the water. Alternatively, after the water is continuously discharged for a set time, the induction control circuit 6 controls the solenoid valve 5 to be closed, so as to shut off the water automatically. When the flow of water is controlled in an induction manner, if the first valve cartridge 3 and/or the second valve cartridge 4 are opened, the induction will immediately fail, and the first valve cartridge 3 and/or the second valve cartridge 4 need to be closed to achieve water shutoff. In the present invention, when an abnormal induction or power failure occurs, that is, when an abnormality or power failure occurs in the induction control circuit 6, the flow of water can be controlled in a manual manner through the first valve cartridge 3 and/or the second valve cartridge 4. Therefore, the present invention provides a manual mode and an induction mode to control the flow of water. It is convenient to use the faucet, and the service life of the faucet can be prolonged.

Figure 2:
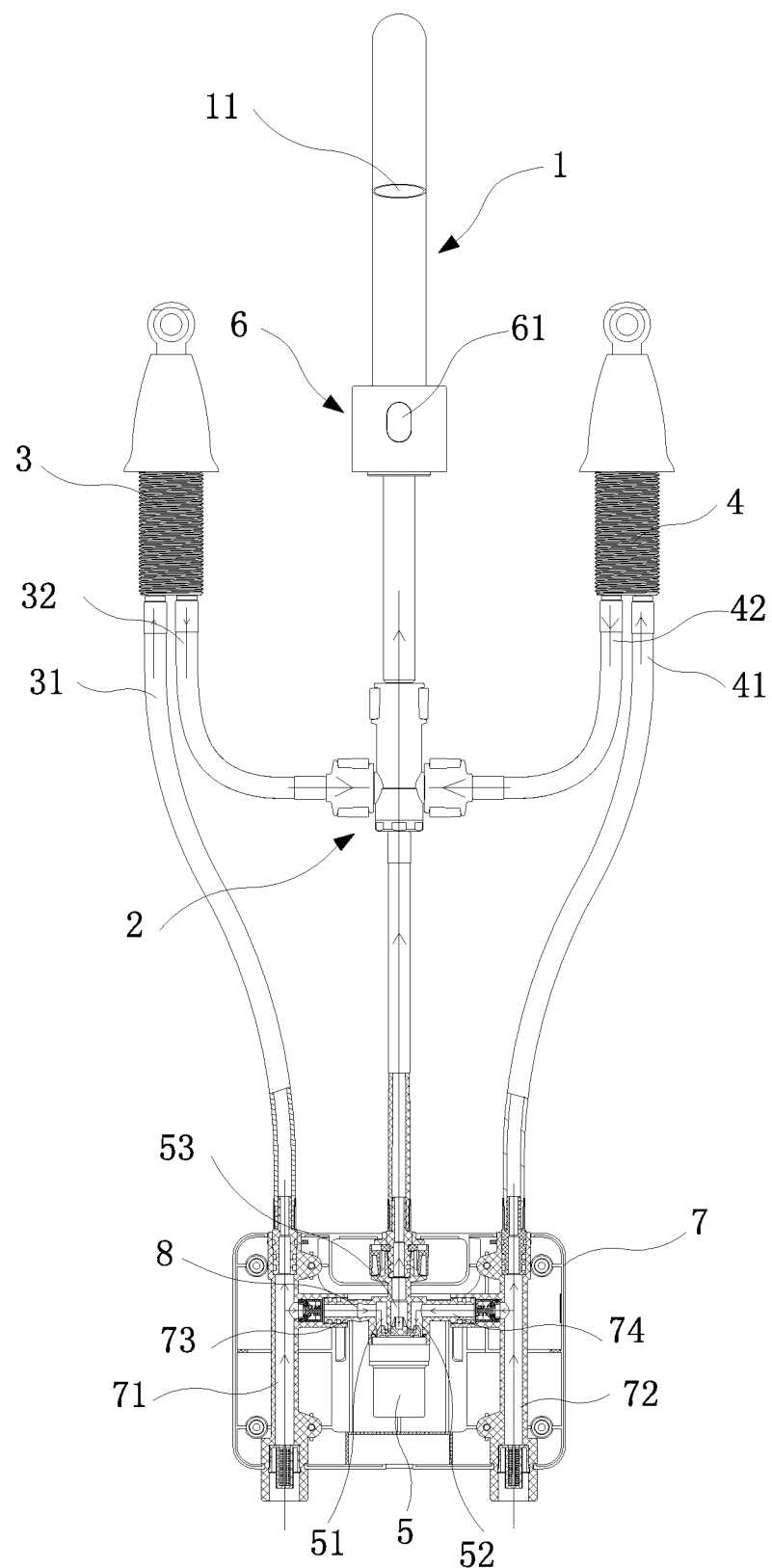
FIG. 2 is a cross-sectional view of the faucet of the present invention.
Figure 5:
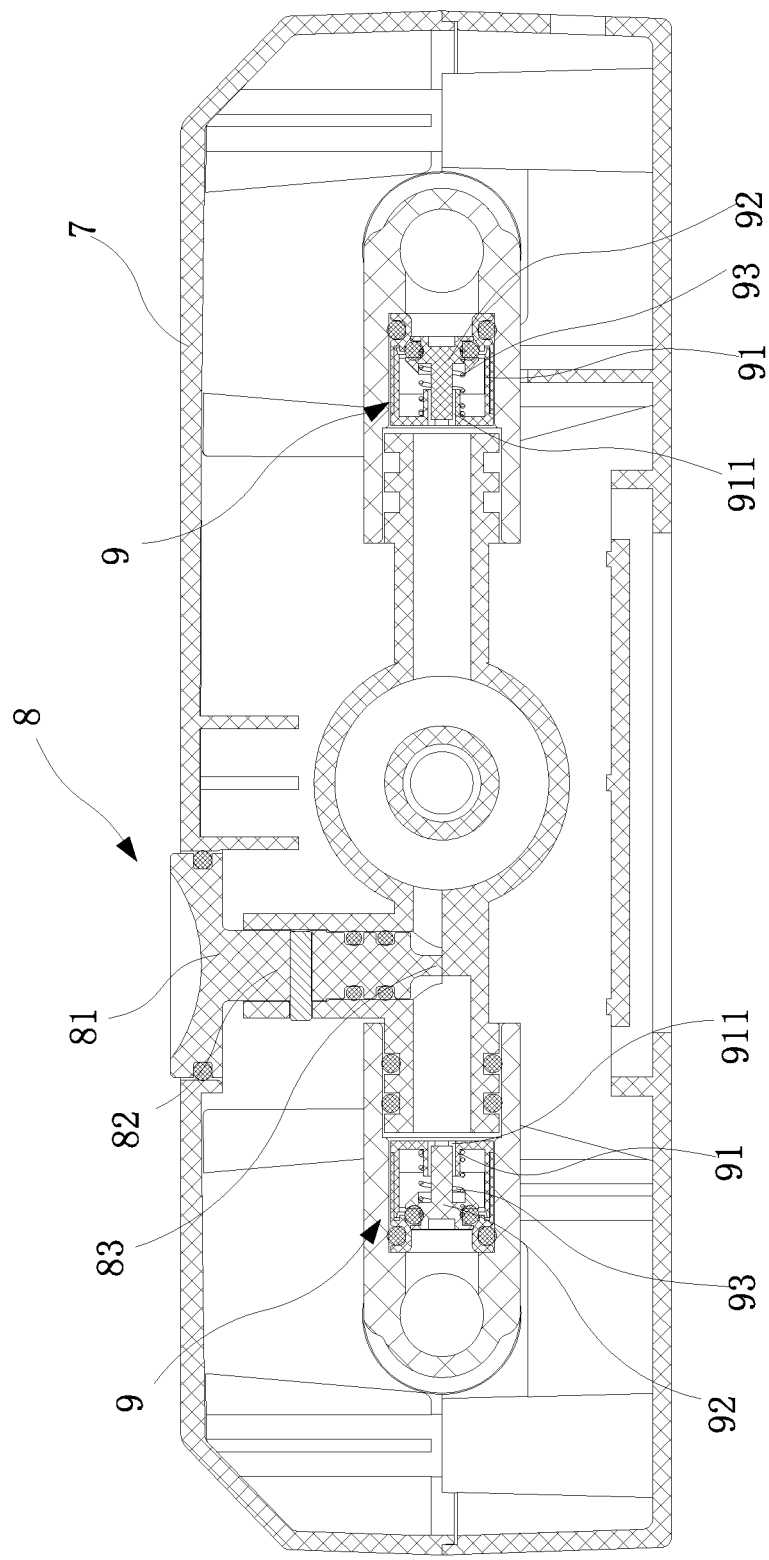
FIG. 5 is a cross-sectional view of the control box of the present invention.

As shown in FIG. 1, FIG. 2 and FIG. 5, the present invention further comprises a control box 7. The control box 7 is provided with a first inlet passage 71 for connecting with the first water supply and a second inlet passage 72 for connecting with the second water supply. The first inlet passage 71 is connected to the first inlet end 31 of the first valve cartridge 3. The second inlet passage 72 is connected to the second inlet end 41 of the second valve cartridge 4. The first water inlet 51 of the solenoid valve 5 communicates with the first inlet passage 71 through a first connecting passage 73. The second water inlet 52 of the solenoid valve 5 communicates with the second inlet passage 72 through a second connecting passage 74. In addition, the solenoid valve 5 can be arranged in the control box 7. The communication valve 2, the first valve cartridge 3, the second valve cartridge 4 and the control box 7 are arranged outside the faucet spout 1. The connecting valve 2, the first valve cartridge 3, the second valve cartridge 4 and the control box 7 are separately arranged from the faucet spout 1. In this way, users can choose different styles of faucet spouts 1 according to their own needs.

Figure 3:
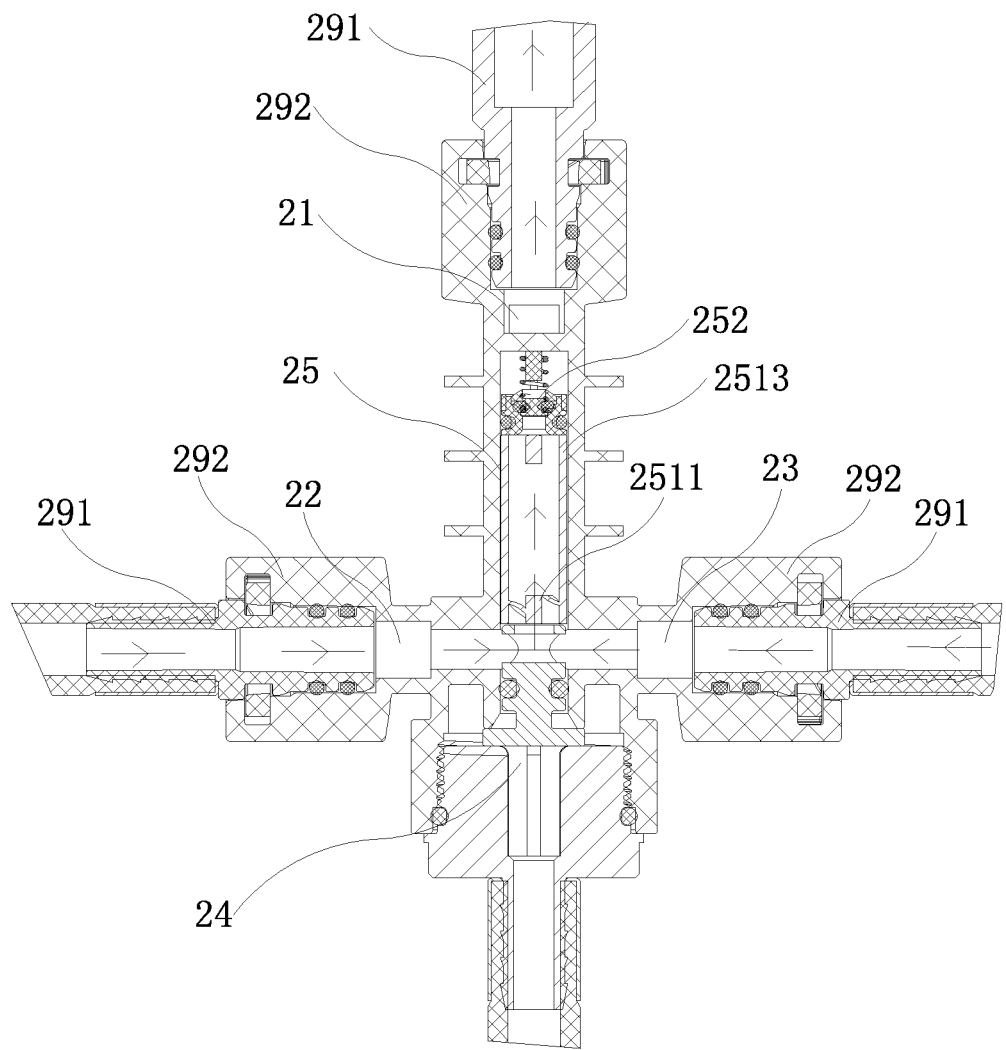
FIG. 3 is a first cross-sectional view of the communication valve of the present invention.
Figure 4:
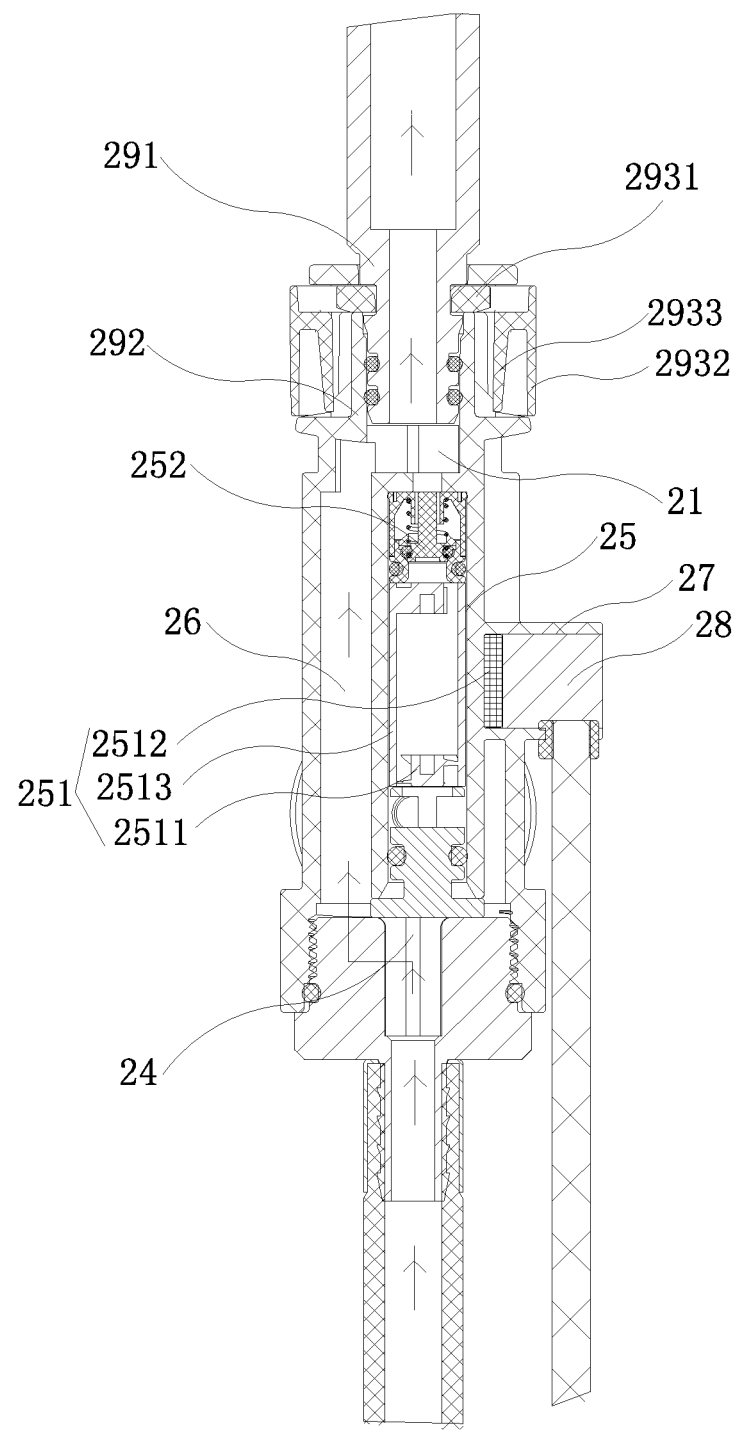
FIG. 4 is a second cross-sectional view of the communication valve of the present invention.

As shown in FIG. 3 and FIG. 4, the water flow sensor 251 may include a magnetic impeller 2511 that is rotatably arranged in the first channel 25 and a Hall element 2512 that is arranged outside the first channel 25. The Hall element 2512 is electrically connected to the induction control circuit 6. When the water passes through the first channel 25, the flow of water will push the magnetic impeller 2511 to rotate. The Hall element 2512 is configured to sense whether the magnetic impeller 2511 rotates and output a signal to the induction control circuit 6. When the flow of water in the first channel 25 pushes the magnetic impeller 2511 to rotate, the magnetic impeller 2511 rotates to generate a changing magnetic field. The Hall element 2512 senses the change in the magnetic field of the magnetic impeller 2511 and accordingly generates a signal and outputs it to the induction control circuit 6. The magnetic impeller 2511 may be rotatably fitted with an impeller tube 2513 that has two open ends. The impeller tube 2513 is fitted in the first channel 25. The outer side of the communication valve 2, corresponding in position to the first channel 25, is formed with a receiving groove 27. The Hall element 2512 is fitted in the receiving groove 27. The receiving groove 27 is provided with glue 28 for sealing the Hall element 2512. The glue 28 plays the role of fixing the Hall element 2512 and protecting the Hall element 2512. In addition, the outlet of the first channel 25 of the communication valve 2 is provided with a check valve 252 that allows water to flow in one direction only to the output end 21 of the communication valve 2. In this way, when the flow of water is controlled in an induction manner, the check valve 252 can prevent water from flowing from the output end 21 of the communication valve 2 into the first channel 25 to rotate the magnetic impeller 2511.

The first water supply may be a hot water supply, and the second water supply may be a cold water supply. When hot water is needed, the first valve cartridge 3 is opened, and the first water supply enters the first inlet end 31 of the first valve cartridge 3 through the first inlet passage 71, and enters the communication valve 2 through the first outlet end 32 of the first valve cartridge 3, and then flows out from the outlet channel 11 of the faucet spout 1. When cold water is needed, the second valve cartridge 4 is opened, and the second water supply enters the second inlet end 41 of the second valve cartridge 4 through the second inlet passage 72, and enters the communication valve 2 through the second outlet end 42 of the second valve cartridge 4, and then flows out from the outlet channel 11 of the faucet spout 1. When cold and hot mixed water is required, both the first valve cartridge 3 and the second valve cartridge 4 are opened, so that both the first water supply and the second water supply enter the communication valve 2 to be mixed in the communication valve 2, and then the mixed water flows out from the outlet channel 11 of the faucet spout 1. When the flow of water is controlled in an induction manner, the hot water of the first water supply enters the first water inlet 51 through the first connecting passage 73, and then enters the output waterway 53 through the solenoid valve 5; at the same time, the cold water of the second water supply enters the second water inlet 52 through the second connecting passage 74, and then enters the output waterway 53 through the solenoid valve 5, so that the hot water and the cold water are mixed in the output waterway 53, and then the mixed water flows out from the outlet channel 11 of the faucet spout 1.

Figure 6:
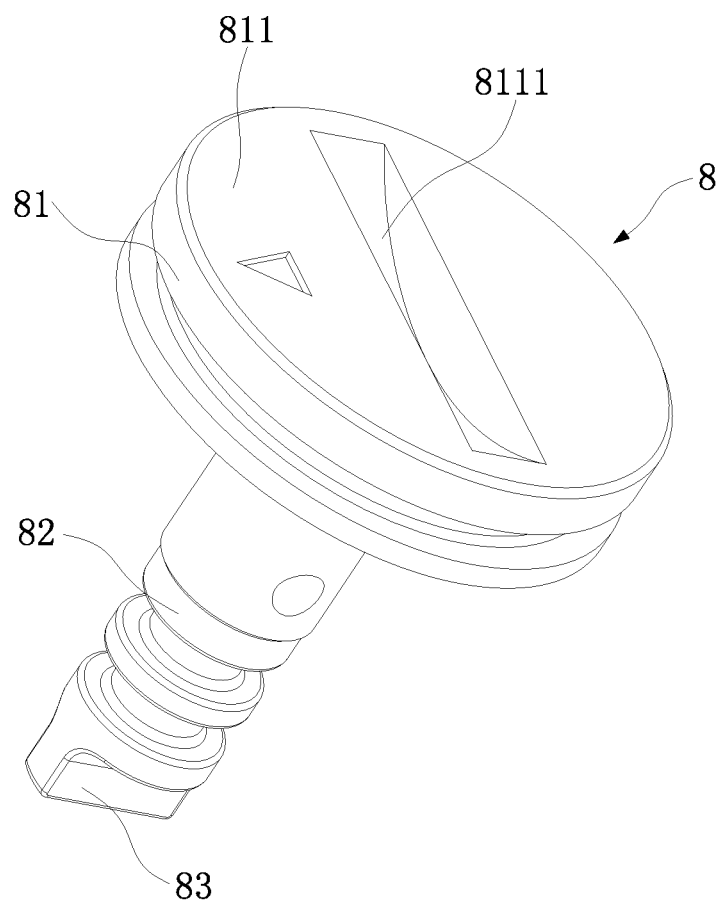
FIG. 6 is a perspective view of the flow control valve of the present invention.
Figure 7:
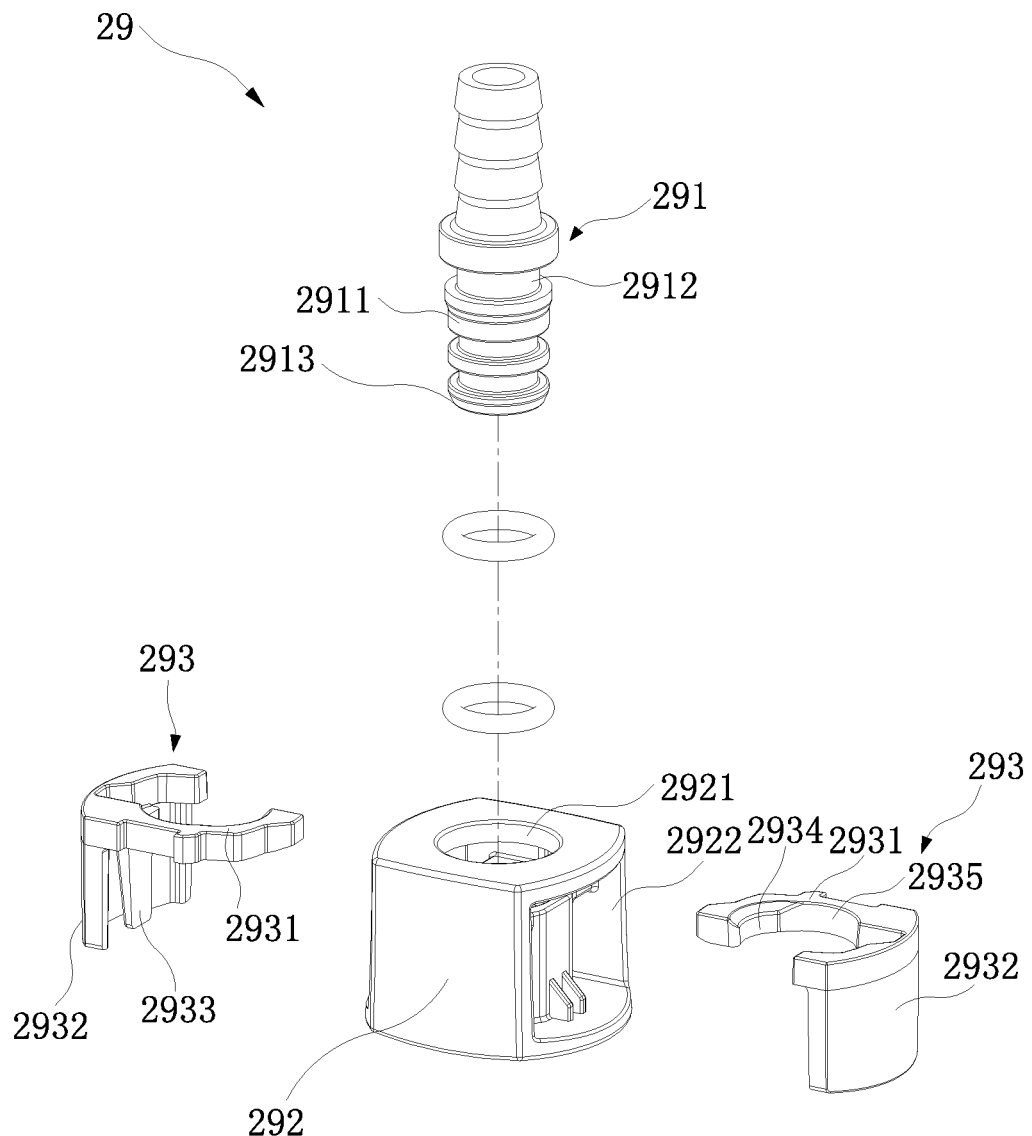
FIG. 7 is an exploded view of the quick-release structure of the present invention.
Figure 8:
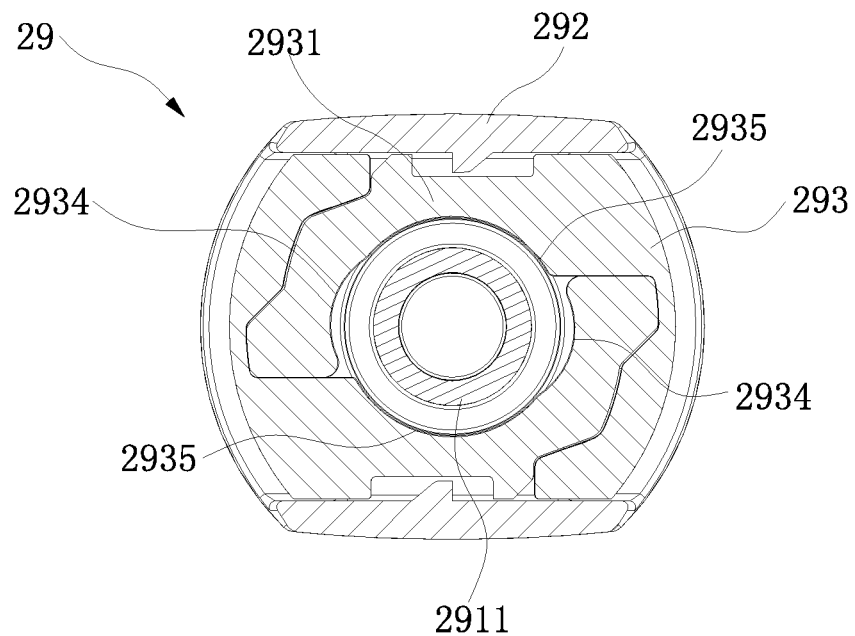
FIG. 8 is a cross-sectional view of the quick-release structure in an unlocked state of the present invention.
Figure 9:
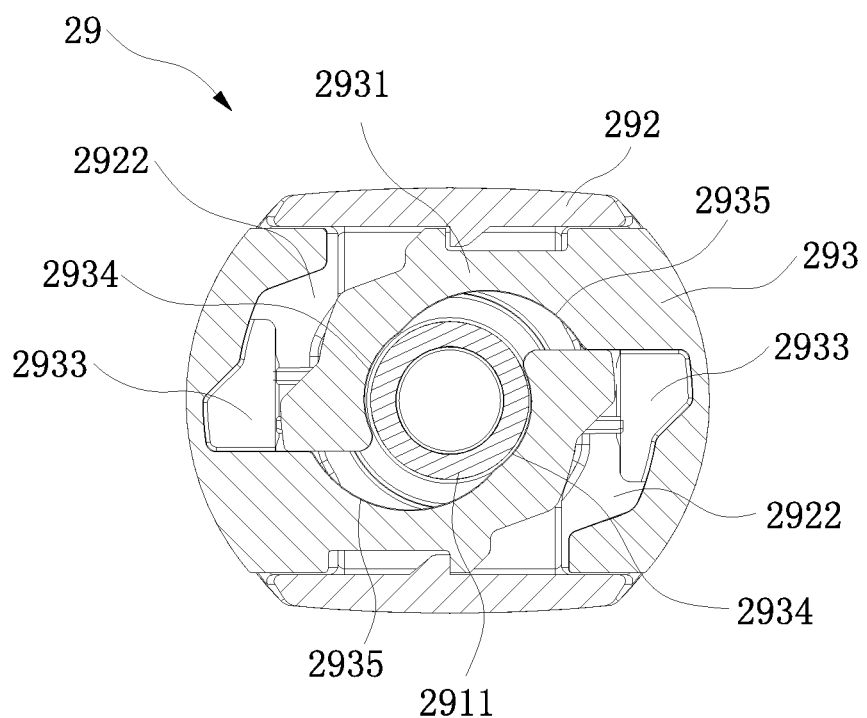
FIG. 9 is a cross-sectional view of the quick-release structure in a locked state of the present invention.

As shown in FIG. 2, FIG. 5 and FIG. 6, the first connecting passage 73 of the present invention can be provided with a flow control valve 8 to control the amount of the water flow. The flow control valve 8 includes a valve seat 81, a valve stein 82, and a valve plate 83. One end of the valve stein 82 is connected to the valve seat 81, and the other end of the valve stein 82 is connected to the valve plate 83. The valve plate 83 is inserted into the first connecting passage 73. The valve seat 81 is rotatable to change the water-passing area of the first connecting passage 73 to control the water flow. The flow control valve 8 plays the role of adjusting the water temperature. When relatively hot water is needed, the flow control valve 8 can control a large amount of hot water in the first connecting passage 73 to flow to the output waterway 53; when warm water is needed, the flow control valve 8 can control a middle amount of hot water in the first connecting passage 73 to flow to the output waterway 53; when relatively cold water is needed, the flow control valve 8 can control a small amount of hot water in the first connecting passage 73 to flow to the output waterway 53, thus, water of different temperatures can be output from the outlet channel 11 according to the needs of users. The valve seat 81 may have an adjustment surface 811, and the adjustment surface 811 is formed with an adjustment groove 8111. The adjustment groove 8111 is adapted for the user to turn the valve seat 81 for adjusting the water temperature. For example, the user can insert a coin or a key into the adjustment groove 8111, and then turn the adjustment groove 8111 to drive the valve seat 81 to rotate, thereby achieving the purpose of adjusting the water temperature.

As shown in FIG. 5, each of the first connecting passage 73 and the second connecting passage 74 is provided with a one-way valve 9 that allows water to flow to the solenoid valve 5. The one-way valve 9 includes a valve body 91, a valve plug 92, and a compression spring 93. The valve body 91 has a water-passing cavity 911 therein. The valve plug 92 is disposed in the water-passing cavity 911 and is movable axially along the water-passing cavity 911. The compression spring 93 is sleeved on the valve plug 92. One end of the compression spring 93 abuts against the valve body 91, and the other end of the compression spring 93 abuts against the valve plug 92 for blocking an inlet of the water-passing cavity 911. When water flows through the solenoid valve 5, water pressure drives the valve plug 92 to move and open the inlet of the water-passing cavity 911.

As shown in FIG. 2, FIG. 3, FIG. 4, FIG. 7, FIG. 8 and FIG. 9, the first input end 22, the second input end 23 and the output end 21 of the communication valve 2 respectively communicate with the first outlet end 32 of the first valve cartridge 3, the second outlet end 42 of the second valve cartridge 4 and the outlet channel 11 of the faucet spout 1 through a quick-release structure 29 for quick disassembly and assembly. The quick-release structure 29 includes a hollow connector 291 and a receiving seat 292. One end of the connector 291 is formed with a plug-in tube 2911 mating with the receiving seat 292. The outer wall of the plug-in tube 2911 is formed with an engaging groove 2912. A middle portion of the receiving seat 292 is formed with a receiving hole 2921 mating with the plug-in tube 2911 of the connector 291. The receiving seat 292 is provided with two opposite elastic buckles 293. The two elastic buckles 293 can be moved towards each other or moved away from each other to release or hold the plug-in tube 2911 of the connector 291. Two sides of the receiving seat 292 are formed with side grooves 2922 for accommodating the respective elastic buckles 293. Each elastic buckle 293 has a holding arm 2931 with a C-shaped opening. The holding arm 2931 is fitted with the engaging groove 2912 of the plug-in tube 2911. Each elastic buckle 293 further has a blocking wall 2932 corresponding in shape to the opening of the side groove 2922. The inner side of the blocking wall 2932 is provided with an elastic piece 2933. Two ends of the elastic piece 2933 respectively act on the elastic buckle 293 and the receiving seat 292 to give the elastic buckle 293 an outward force. The inner surface of the C-shaped opening of the holding arm 2931 is composed of a small arc surface 2934 with a smaller radius in the front section and a large arc surface 2935 with a larger radius in the rear section. When the small arc surfaces 2934 of the two elastic buckles 293 face each other to form a small hole, the quick-release structure is in a locked state. At this time, the holding arms 2931 of the two elastic buckles 293 are engaged in the engaging groove 2912 on the outer wall of the plug-in tube 2911 to hold the plug-in tube 2911 tightly. When the large arc surfaces 2935 of the two elastic buckles 293 face each other to form a large hole, the quick-release structure is in an unlocked state. At this time, the holding arms 2931 of the two elastic buckles 293 release the plug-in tube 2911, and the connector 291 can freely enter and exit the receiving seat 292. The working principle of the quick-release structure of the present invention is described below. When the connector 291 is connected to the receiving seat 292, the plug-in tube 2911 of the connector 291 is inserted into the receiving seat 292 first. Under the action of the insertion force, the connector 291 pushes the small arc surfaces 2934 of the two elastic buckles 293 outwards and drives the two elastic buckles 293 to move towards each other so that the large arc surfaces 2935 of the two elastic buckles 293 face each other to form a large hole. In this way, the plug-in tube 2911 of the connector 291 can be easily inserted into the receiving hole 2921 of the receiving seat 292. After being inserted in place, the two elastic buckles 293 move outward and return under the elastic force of the elastic pieces 2933, so that the small arc surfaces 2934 of the two elastic buckles 293 face each other to form a small hole, and the holding arms 2931 of the two elastic buckles 293 are tightly engaged in the engaging groove 2912 of the connector 291, so as to lock the connector 291. It is very convenient to assemble the connector 291 and the receiving seat 292. When it is necessary to disassemble the connector 291 and the receiving seat 292, the two elastic buckles 293 are pressed to move the two elastic buckles 293 towards each other, so that the large arc surfaces 2935 of the two elastic buckles 293 face each other to form a large hole. At this time, the connector 291 can be easily disengaged from the receiving seat 292. In order to facilitate the plug-in tube 2911 to push the small arc surfaces 2934 of the two elastic buckles 293, the end of the plug-in tube 2911 may be formed with a conical surface 2913. As shown in FIG. 2 and FIG. 3, the receiving seat 292 and the connector 291 of the quick-release structure 29 that connects the first input end 22 of the communication valve 2 and the first outlet end 32 of the first valve cartridge 3 are connected to the first input end 22 of the communication valve 2 and the first outlet end 32 of the first valve cartridge 3, respectively. The receiving seat 292 and the connector 291 of the quick-release structure 29 that connects the second input end 23 of the communication valve 2 and the second outlet end 42 of the second valve cartridge 4 are connected to the second input end 23 of the communication valve 2 and the second outlet end 42 of the second valve cartridge 4, respectively. The receiving seat 292 and the connector 291 of the quick-release structure 29 that connects the output end 21 of the communication valve 2 and the outlet channel 11 of the faucet spout 1 are connected to the output end 21 of the communication valve 2 and the outlet channel 11 of the faucet spout 1, respectively.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A faucet, comprising:
   a faucet spout, the faucet spout having an outlet channel therein;
   a communication valve, having an output end, a first input end, a second input end and a third input end, the output end being connected to the faucet spout, a first channel and a second channel being provided in the communication valve, the first channel communicating with the first input end, the second input end, and the output end, the first channel being provided with a water flow sensor, the second channel communicating with the third input end and the output end, wherein the output end is connected to the faucet spout;
   a first valve cartridge, having a first inlet end and a first outlet end, the first outlet end being connected to the first input end of the communication valve, the first inlet end being configured to connect with a first water supply, as a result, the first valve cartridge is connected to the faucet spout through the first channel;
   a second valve cartridge, having a second inlet end and a second outlet end, the second outlet end being connected to the second input end of the communication valve, the second inlet end being configured to connect with a second water supply, as a result, the second valve cartridge is connected to the faucet spout through the first channel;
   a control box, the control box being provided with a first inlet passage for connecting with the first water supply and a second inlet passage for connecting with the second water supply, the first inlet passage being connected to the first inlet end of the first valve cartridge, the second inlet passage being connected to the second inlet end of the second valve cartridge;
   a solenoid valve, having a first water inlet, a second water inlet and an output waterway, the first water inlet being configured to connect with the first water supply, the second water inlet being configured to connect with the second water supply, the output waterway being connected to the third input end of the communication valve, as a result, the solenoid valve is connected to the faucet spout through the second channel, the first water inlet of the solenoid valve communicating with the first inlet passage through a first connecting passage, the second water inlet of the solenoid valve communicating with the second inlet passage through a second connecting passage;
   an induction control circuit, disposed on the faucet spout and including an induction window,
   wherein when flow of water is controlled in a manual manner, the first valve cartridge and/or the second valve cartridge are opened, the induction control circuit receives a signal generated by the water flow sensor as the water flows through the first channel, the induction control circuit controls the solenoid valve to be closed according to the signal and an induction fails,
   wherein when the flow of water is controlled in an induction manner, the first valve cartridge and the second valve cartridge are closed, the induction control circuit does not receive the signal of the water flow sensor and triggers the induction window for induction, and the induction control circuit controls the solenoid valve to be opened,
   wherein the first connecting passage is provided with a flow control valve,
   wherein the flow control valve includes a valve seat, a valve stem, and a valve plate, one end of the valve stem is connected to the valve seat, another end of the valve stem is connected to the valve plate, the valve plate is inserted into the first connecting passage, and the valve seat is rotatable to change a water-passing area of the first connecting passage, and
   wherein the valve seat has an adjustment surface, and the adjustment surface is formed with an adjustment groove.

2. The faucet as claimed in claim 1, wherein each of the first connecting passage and the second connecting passage is provided with a one-way valve that allows water to flow to the solenoid valve.

3. The faucet as claimed in claim 2, wherein the one-way valve includes a valve body, a valve plug and a compression spring, the valve body has a water-passing cavity therein, the valve plug is disposed in the water-passing cavity and is movable axially along the water-passing cavity, the compression spring is sleeved on the valve plug, one end of the compression spring abuts against the valve body, and another end of the compression spring abuts against the valve plug for blocking an inlet of the water-passing cavity, when water flows through the solenoid valve, water pressure drives the valve plug to move and open the inlet of the water-passing cavity.

4. The faucet as claimed in claim 1, wherein the solenoid valve is arranged in the control box.

5. The faucet as claimed in claim 1, wherein the first water supply is a hot water supply.

6. The faucet as claimed in claim 1, wherein the second water supply is a cold water supply.

7. The faucet as claimed in claim 1, wherein the water flow sensor includes a magnetic impeller that is rotatably arranged in the first channel and a Hall element that is arranged outside the first channel, the Hall element is electrically connected to the induction control circuit;
   the Hall element is configured to sense whether the magnetic impeller rotates and output the signal to the induction control circuit.

8. The faucet as claimed in claim 7, wherein an outer side of the communication valve, corresponding in position to the first channel, is formed with a receiving groove, the Hall element is fitted in the receiving groove, and the receiving groove is provided with glue for sealing the Hall element.

9. The faucet as claimed in claim 7, wherein an outlet of the first channel of the communication valve is provided with a check valve that allows water to flow in one direction only to the output end of the communication valve.

10. The faucet as claimed in claim 1, wherein the first input end, the second input end and the output end of the communication valve respectively communicate with the first outlet end of the first valve cartridge, the second outlet end of the second valve cartridge and the outlet channel of the faucet spout through a quick-release structure;
    the quick-release structure includes a hollow connector and a receiving seat, one end of the connector is formed with a plug-in tube mating with the receiving seat, a middle portion of the receiving seat is formed with a receiving hole mating with the plug-in tube of the connector, the receiving seat is provided with two opposite elastic buckles, the two elastic buckles can be moved towards each other or moved away from each other to release or hold the plug-in tube of the connector;
    the receiving seat and the connector of the quick-release structure that connects the first input end of the communication valve and the first outlet end of the first valve cartridge are connected to the first input end of the communication valve and the first outlet end of the first valve cartridge, respectively;

the receiving seat and the connector of the quick-release structure that connects the second input end of the communication valve and the second outlet end of the second valve cartridge are connected to the second input end of the communication valve and the second outlet end of the second valve cartridge, respectively;

the receiving seat and the connector of the quick-release structure that connects the output end of the communication valve and the outlet channel of the faucet spout are connected to the output end of the communication valve and the outlet channel of the faucet spout, respectively.

11. The faucet as claimed in claim 10, wherein each elastic buckle has a holding arm with a C-shaped opening, an inner surface of the C-shaped opening of the holding arm is composed of a small arc surface with a smaller radius and a large arc surface with a larger radius;

an outer wall of the plug-in tube of the connector is formed with an engaging groove, when the small arc surfaces of the two elastic buckles face each other to form a small hole, the holding arms of the two elastic buckles hold the plug-in tube of the connector tightly;

when the large arc surfaces of the two elastic buckles face each other to form a large hole, the plug-in tube of the connector can enter and exit the receiving seat.

12. The faucet as claimed in claim 10, wherein an inner side of each elastic buckle is provided with an elastic piece, and two ends of the elastic piece respectively act on the elastic buckle and the receiving seat to give the elastic buckle an outward force.

13. The faucet as claimed in claim 12, wherein two sides of the receiving seat are formed with side grooves for accommodating the respective elastic buckles;

each elastic buckle further has a blocking wall corresponding in shape to an opening of a corresponding one of the side grooves, and the elastic piece is disposed on an inner side of the blocking wall.

* * * * *